July 28, 1925.
J. ZARADZKI
1,547,485
FLEXIBLE WHEEL TRACK
Filed Sept. 11, 1924
2 Sheets-Sheet 1
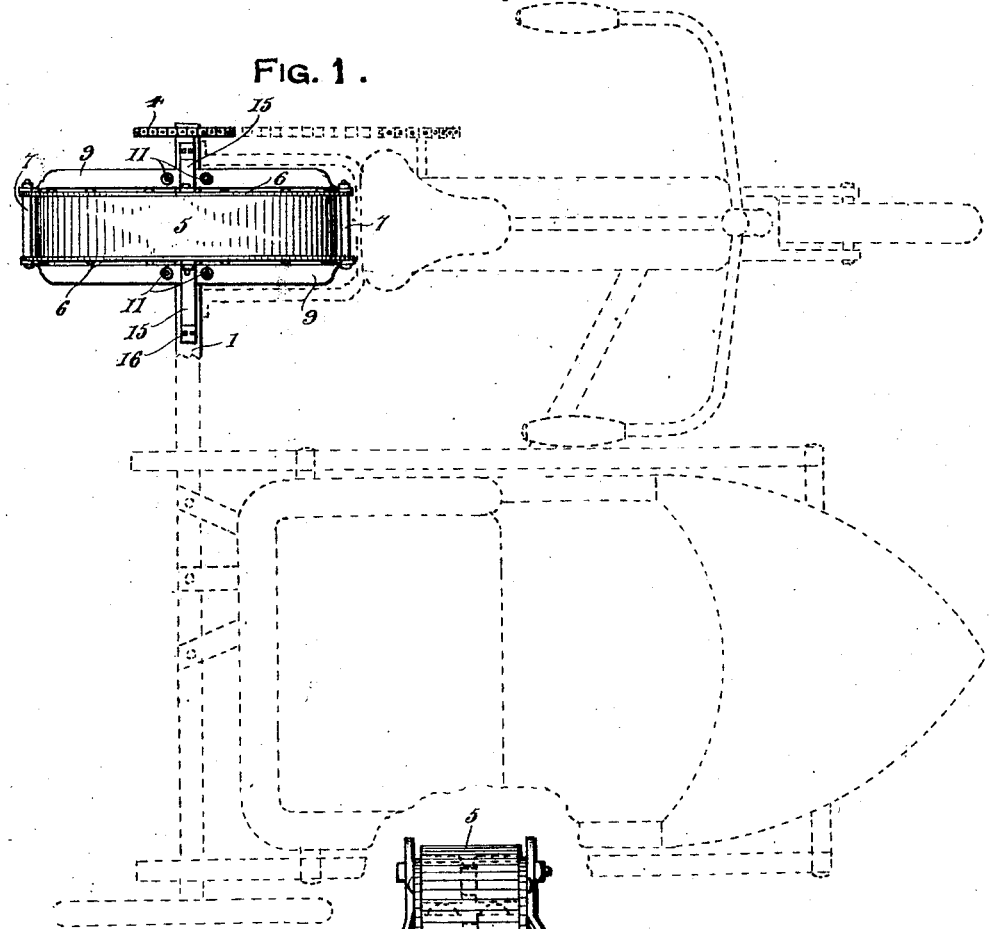
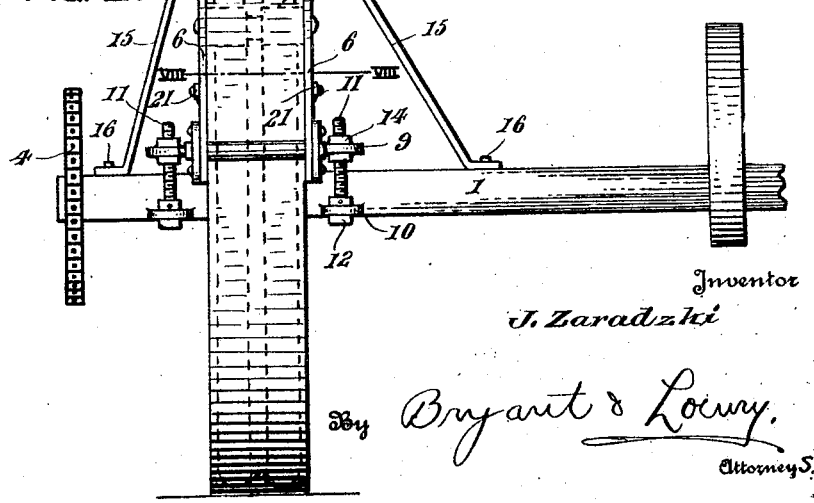
Inventor
J. Zaradzki
By Bryant & Lowry.
Attorneys

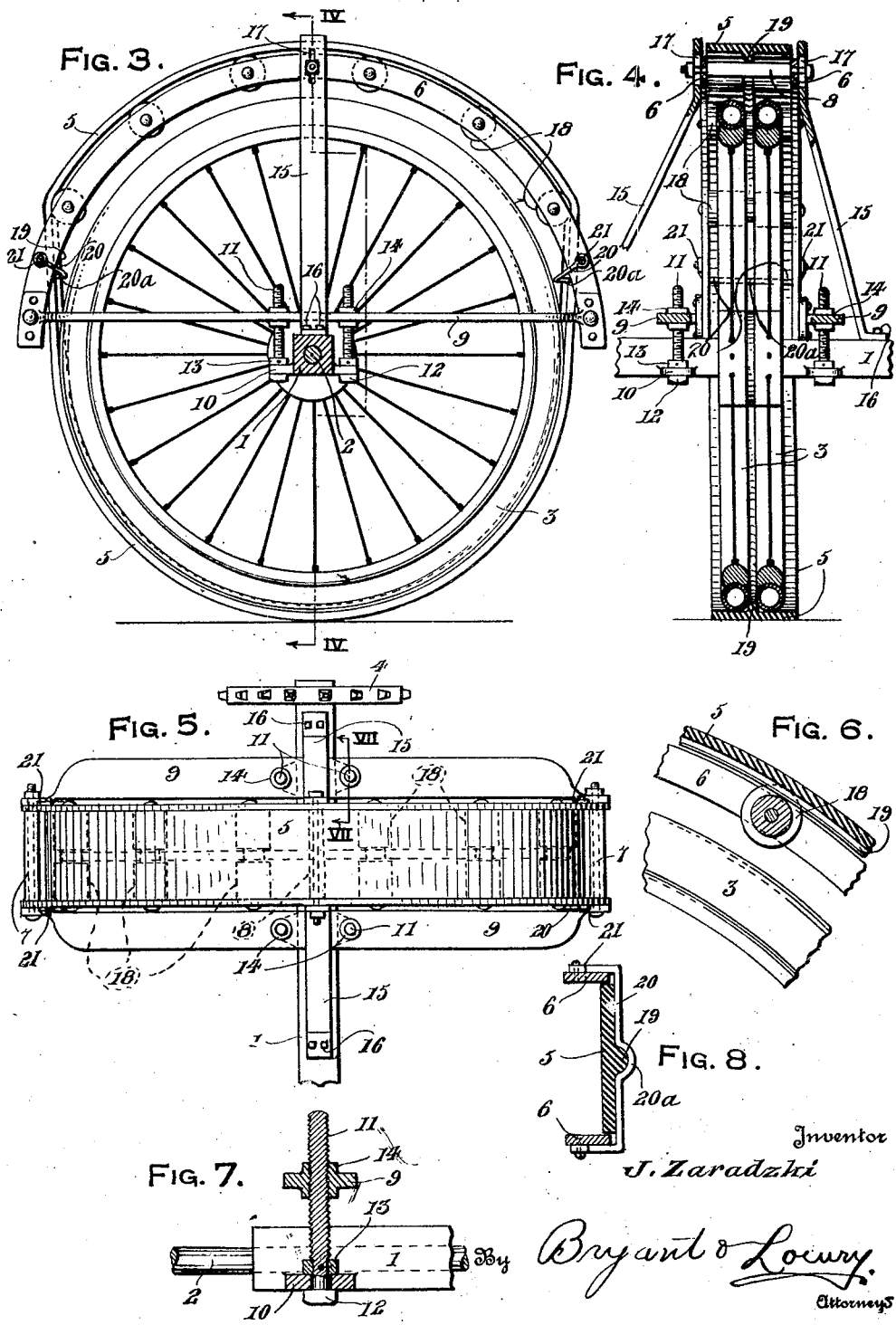

Patented July 28, 1925.

1,547,485

UNITED STATES PATENT OFFICE.

JAN ZARADZKI, OF EVANSTON, ILLINOIS.

FLEXIBLE WHEEL TRACK.

Application filed September 11, 1924. Serial No. 737,132.

*To all whom it may concern:*

Be it known that I, JAN ZARADZKI, a citizen of Poland, residing at Evanston, in the county of Cook and State of Illinois, have invented certain new and useful Improvements in Flexible Wheel Tracks, of which the following is a specification.

This invention relates to certain new and useful improvements in flexible wheel tracks, and while the same is herein illustrated as associated with a motor cycle having a side car attached thereto, it is to be understood that the flexible wheel track may be employed in connection with any type of vehicle desired, either horse drawn or motor propelled.

The primary object of the invention is to provide a flexible wheel track wherein a flexible band enclosing a traction wheel has a guide frame therefore supported on the wheel axle to space the upper section of the flexible track from the upper side of the wheel and with the lower side of the wheel engaging the lower side of the flexible track at the ground line.

A further object of the invention is to provide an adjustable support for the frame with which the flexible wheel track is movably associated so that the flexible track may be placed under proper tension at all times and to eliminate unnecessary slack or loose play in the flexible track which might occur incident to the use of the same.

With the above general objects in view and others that will appear as the nature of the invention is better understood, the same consists of the novel form, combination and arrangement of parts hereinafter more fully described, shown in the accompanying drawings and claimed.

In the drawings, wherein like reference characters designate corresponding parts throughout the several views, Figure 1 is a top plan view of a flexible wheel track and its associated mechanism, the same being illustrated as mounted upon the rear driving wheel of a motorcycle having a side car attachment that is illustrated by dotted lines, Figure 2 is a fragmentary rear elevational view of the same, Figure 3 is a side elevational view of the wheel with the flexible wheel track enclosing the same and showing the adjustable mounting for the guide frame of the flexible wheel track, Figure 4 is a vertical cross-sectional view taken on line IV—IV of Fig. 3, Figure 5 is a top plan view, Figure 6 is a detail sectional view showing the flexible track passing over one of the guide rollers carried by the frame at the upper side of the wheel, Figure 7 is a detail sectional view taken on line VII—VII of Fig. 5 showing one of the screws for shifting the frame to control the tension on the flexible track, and Figure 8 is a detail sectional view taken on line VIII—VIII on Fig. 2.

Referring more in detail to the accompanying drawings, and particularly to Fig. 1, it will be noted as illustrated by dotted lines, that the flexible wheel track is associated with the rear driving wheel of a motor cycle having a side car attached thereto, but it is to be understood that the flexible track may be mounted upon a wheel of any character and for various purposes. As illustrated, the rear axle bar 1 has a drive axle 2 journaled therethrough as shown in Fig. 3 with a pair of drive wheels 3 fixed to the axle that is driven by a motor associated with the sprocket wheel 4 upon the end of the axle as shown in Fig. 5.

An annular flexible wheel track 5 encloses the driving wheels 3 and is supported in proper position relative to said wheels by a frame structure. The frame structure includes semi-circular side plates 6 disposed outwardly of the wheels 3 and at the upper sides thereof and are connected by cross bolts 7 disposed at the lower ends thereof, and another cross bolt 8 at the upper sides and intermediate the ends as shown in Figs. 3 to 5. The ends of the side plates 6 at the opposite sides of the wheels 3 are connected by horizontal arms 9 that are anchored to the bolts 7 and constitute part of the devices for supporting the guide frame upon the axle bar 1.

To provide an adjustable mounting for the track guide frame, the axle bar 1 at opposite sides of the wheel 3, as clearly illustrated in Fig. 2 carries outwardly directed lugs 10 with which adjusting screws 11 are associated as shown in Fig. 7, the head 12 of the screw being disposed beneath the lug 11 and the collar 13 secured to the screw above said lug affords a rotatable mounting for the screw and retains the same against longitudinal or vertically shifting movement. The upper ends of the adjusting screws 11 are threaded through bearings 14 carried by the side arms 9 adjacent the axle bar 1 and the adjusting screws constitute supports for the track guide frame, it being understood that the guide frame is vertically shiftable relative to the wheels 3 upon adjusting or rotating the screws 11 in the desired direction. In order to prevent laterally tilting movement of the track guide frame, angle braces 15 anchored at their lower ends as at 16 to the axle bar 1 at opposite sides of the wheels 3 are slotted at their upper ends as at 17 to receive the opposite ends of the connecting bolt 8 which will permit vertically shifting movement of the track guide frame and prevent lateral tilting movements thereof.

Guide rollers 18 are journaled between the semi-circular side plates 6 and the flexible track 5 travels above the guide rollers and in contact therewith as illustrated in Fig. 3, the flexible track being disposed inwardly of the connecting bolts 7 with the wheels 3 engaging the track at the lower side thereof as shown in Fig. 4, and where two wheels are employed as illustrated, a centrally disposed rib 19 projects inwardly from the track 5 to assist in maintaining the proper spacing of the wheels 3.

In order to prevent the collection of mud or other foreign matter between the flexible track and guide frame, the side members 6 carry a scraper adjacent each end thereof as illustrated in Figs. 3 and 8, the scraper being in the form of an arm 20 secured at its ends as at 21 to the side member 6 and having a central offset portion 20ª that rides over the track rib 19.

From the above detail description of the device, it is believed that the construction and operation thereof will at once be apparent, it being noted that the flexible wheel track 5 completely encloses the tread surfaces of the wheels 3 and the track is continuously laid for the wheels during rotation of the latter. The track 5 is maintained under proper tension by adjusting the guide frame therefor upon operating the screws 11 for vertically shifting the guide frame. Laterally tilting movement of the guide frame is prevented by the angle brace bars 15 which are connected to the guide frame in a manner to permit free vertically shifting movements thereof.

While there is herein shown and described the preferred embodiment of the present invention, it is nevertheless to be understood that minor changes may be made therein without departing from the spirit and scope of the invention as claimed.

What is claimed is:—

1. In a device of the type described, the combination with a driven wheel and axle bar, of an endless flexible track inclosing the wheel, a guide frame for the track and means for shifting the guide frame relative to the wheel to obtain a taut condition of the flexible track.

2. In a device of the type described, the combination with a driven wheel and axle bar, of an endless flexible track inclosing the wheel, a guide frame for the track, means for shifting the guide frame relative to the wheel to obtain a taut condition of the flexible track, guide rollers on the frame for the track, and angle brace bars extending between the axle bar and guide frame to prevent lateral tilting of the guide frame relative to the wheel.

3. In a device of the type described, the combination with a driven wheel and axle bar, of an endless flexible track inclosing the wheel, a guide frame for the track, means for shifting the guide frame relative to the wheel to obtain a taut condition of the flexible track, guide rollers on the frame for the track, angle brace bars extending between the axle bar and guide frame to prevent lateral tilting of the guide frame relative to the wheel, and a bolt and slot connection between the brace bars and guide frame.

4. In a device of the type described, the combination with a driven wheel and axle bar, of an endless flexible track inclosing the wheel, a guide frame for the track and means for shifting the guide frame relative to the wheel to obtain a taut condition of the flexible track, including adjusting screws swiveled to the axle bar and threaded into the guide frame.

5. In a device of the type described, the combination with a driven wheel and axle bar, of an endless flexible track inclosing the wheel, a guide frame for the track, means for shifting the guide frame relative to the wheel to obtain a taut condition of the flexible track including vertically alined lugs carried by the axle bar and guide frame and adjusting screws swiveled in the axle bar lugs and threaded into the guide frame lugs.

In testimony whereof I affix my signature.

JAN ZARADZKI.